United States Patent [19]

Hamner, deceased et al.

[11] Patent Number: 4,923,841
[45] Date of Patent: May 8, 1990

[54] CATALYST FOR THE HYDROISOMERIZATION AND HYDROCRACKING OF WAXES TO PRODUCE LIQUID HYDROCARBON FUELS AND PROCESS FOR PREPARING THE CATALYST

[75] Inventors: Glen P. Hamner, deceased, late of Baton Rouge, by Annabelle Hamner, executrix; Willard H. Sawyer, Baton Rouge, both of La.

[73] Assignee: Exxon Research and Engineering Company, Florham Park, N.J.

[21] Appl. No.: 283,690

[22] Filed: Dec. 13, 1988

Related U.S. Application Data

[63] Continuation-in-part of Ser. No. 134,796, Dec. 18, 1987, abandoned.

[51] Int. Cl.$^5$ .................... B01J 27/12; B01J 27/13
[52] U.S. Cl. .................................... 502/230; 502/229
[58] Field of Search ............................ 502/229, 230

[56] References Cited

U.S. PATENT DOCUMENTS

| | | | |
|---|---|---|---|
| 3,206,525 | 9/1965 | Michaels et al. | 585/740 |
| 3,308,052 | 3/1967 | Ireland et al. | 208/215 X |
| 3,338,843 | 8/1967 | Goble et al. | 502/230 X |
| 3,709,817 | 1/1973 | Suggitt et al. | 208/112 |
| 3,711,399 | 1/1973 | Estes et al. | 208/111 X |
| 3,717,586 | 2/1973 | Suggitt et al. | 502/230 X |
| 4,032,474 | 6/1977 | Goudriaan et al. | 502/230 X |

Primary Examiner—W. J. Shine
Attorney, Agent, or Firm—Roy J. Ott

[57] ABSTRACT

A fluorided platinum-on-alumina catalyst for wax isomerization wherein the platinum is substantially uniformly distributed throughout the catalyst in the form of relatively small crystallites, of the total fluoride present in the catalyst very little is located on the outer surface of the catalyst and a significant concentration of the fluoride within the catalyst is present as aluminum fluoride hydroxide hydrate. The catalyst is prepared by contacting a platinum-on-alumina with a solution having a relatively high concentration of fluoride and drying the fluorided platinum-on-alumina catalyst at temperatures not in excess of 650° F.

14 Claims, 5 Drawing Sheets

FIG. 1B ALUMINUM FLUORIDE HYDROXIDE HYDRATE 18-24
FIG. 1C ALUMINUM OXIDE 10-425

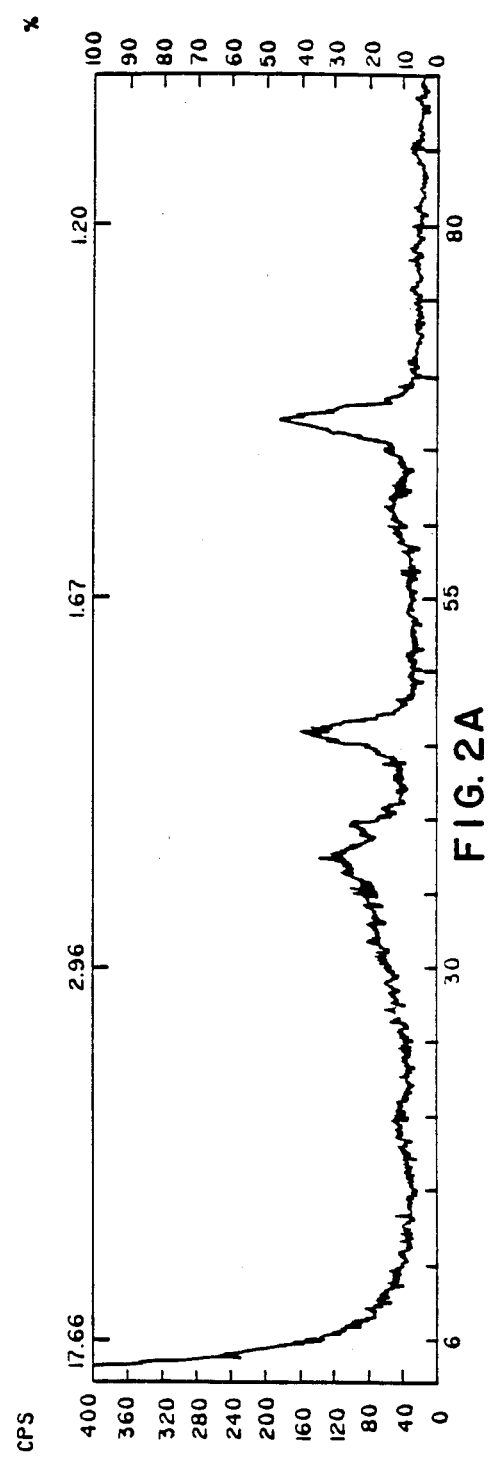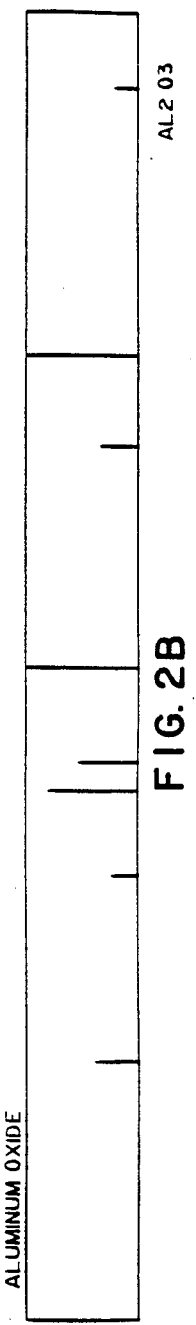
FIG. 2A
FIG. 2B

CATALYST FOR THE HYDROISOMERIZATION AND HYDROCRACKING OF WAXES TO PRODUCE LIQUID HYDROCARBON FUELS AND PROCESS FOR PREPARING THE CATALYST

CROSS-REFERENCE TO COPENDING APPLICATION

This is a Continuation-in-Part application of copending application Ser. No. 134,796 filed Dec. 18, 1987, now abandoned.

BACKGROUND OF THE INVENTION

I. Field of the Invention

This invention relates to a catalyst useful for the production of liquid hydrocarbon fuels from wax. In particular, it relates to a catalyst composition useful for hydroisomerizing and hydrocracking a Fischer-Tropsch wax to normally liquid hydrocarbons, especially more valuable mid distillate hydrocarbons with low freezing point and high diesel cetane index.

II. Description of the Prior Art

In the Fischer-Tropsch process a synthesis gas (CO+$H_2$) made, e.g., from natural gas, is converted over a catalyst, e.g., a ruthenium, iron or cobalt catalyst, to form a wide range of products inclusive of gaseous and liquid hydrocarbons, and oxygenates, and a normally solid paraffin wax which does not contain the sulfur, nitrogen or metals impurities normally found in crude oil. It is generally known to selectively catalytically convert the paraffin wax, or syncrude obtained from such processes to lower boiling paraffinic hydrocarbons falling within the gasoline and middle distillate boiling ranges.

Paraffin waxes have been isomerized over various catalysts, e.g., Group VIB and VIII catalysts of the Periodic Table of the Elements (E. H. Sargent & Co., Copyright 1964 Dyna-Slide Co.) Certain of such catalysts can be characterized as halogenated supported metal catalysts, e.g., a hydrogen chloride or hydrogen fluoride treated platinum-on-alumina catalyst as disclosed, e.g., in U.S. Pat. No. 2,668,866 to G. M. Good et al. In the Good et al process a partially vaporized wax, such as one from a Fischer-Tropsch synthesis process, is mixed with hydrogen and contacted at 300° C. to 500° C. over a bed of supported platinum catalyst. Palladium or nickel may be substituted for platinum. The support may be a number of conventional carrier materials, such as alumina or bauxite. The carrier material may be treated with acid, such as HCl of HF, prior to incorporating the platinum. In preparing the catalyst, pellets of activated alumina may be soaked in a solution of chloroplatinic acid, dried and reduced in hydrogen at 475° C.

U.S. Pat. No. 2,817,693 discloses the catalyst and process of U.S. Pat. No. 2,668,866 with the recommendation that the catalyst be pretreated with hydrogen at a pressure substantially above that to be used in the process.

U.S. Pat. No. 3,268,439 relates to the conversion of waxy hydrocarbons to give products which are characterized by a higher isoparaffin content than the feedstock. Waxy hydrocarbons are converted at elevated temperature and in the presence of hydrogen by contacting the hydrocarbons with a catalyst comprising a platinum group metal, a halogenatable inorganic oxide support and at least one weight percent of fluorine, the catalyst having been prepared by contacting the support with a fluorine compound of the general formula:

where X is carbon or sulphur and Y is fluorine or hydrogen.

U.S. Pat. No. 3,308,052 describes a hydroisomerization process for producing lube oil and jet fuel from waxy petroleum fractions. According to this patent, product quality is dependent upon the type of charge stock, the amount of liquid hydrocarbon in the waxy charge stock and the degree of conversion to products boiling below 650° F. The greater the amount of charge stock converted to material boiling below 650° F. per pass the higher the quality of jet fuel. The catalyst employed in the hydroisomerization zone is a platinum group metal catalyst comprising one or more of platinum, palladium and nickel on a support, such as alumina, bentonite, barite, faujasite, etc., containing chlorine and/or fluorine.

In U.S. Pat. No. 3,365,390 a heavy oil feed boiling at least partly above 900° F. is hydrocracked and oil effluent thereof is separated into fractions, including a distillate fuel and a higher boiling hydrocracked lube oil boiling range fraction. The hydrocracked lubricating oil boiling range fraction is dewaxed to obtain a hydrocracked wax fraction which is hydroisomerized in the presence of a reforming catalyst and the oil effluent thereof is separated into fractions, including a distillate fuel and an isomerized lube oil boiling range fraction.

In U.S. Pat. No. 3,486,993 the pour point of a heavy oil is lowered by first substantially eliminating organic nitrogen compounds present in the oil and then contacting the nitrogen-free oil with a reforming catalyst in a hydrocracking-hydroisomerization zone. Hydroisomerization is conducted at a temperature of 750° F.–900° F. over a naphtha reforming catalyst containing no more than two weight percent halide.

U.S. Pat. No. 3,487,005 discloses a process for the production of low pour point lubricating oils by hydrocracking a high pour point waxy oil feed boiling at least partly above 700° F. in at least two stages. The first stage comprises a hydrocracking-denitrofication stage, followed by a hydrocracking-isomerization stage employing a naphtha reforming catalyst containing a Group VI metal oxide or Group VIII metal on a porous refractory oxide, such as alumina. The hydrocracking-/isomerization catalyst may be promoted with as much as two weight percent fluorine.

U.S. Pat. No. 3,709,817 describes a process which comprises contacting a paraffin hydrocarbon containing at least six carbon atoms with hydrogen, a fluorided Group VIIB or VIII metal alumina catalyst and water. These catalysts are classified by the patentee as a well-known class of hydrocracking catalysts.

SUMMARY OF THE INVENTION

A particulate fluorided Group VIII metal-on-alumina catalyst composition useful for the production of a pumpable refinery processable syncrude, and transportation fuels from a wax, which catalyst is comprised of from about 0.1 to about 2 percent Group VIII metal, preferably from about 0.3 to about 0.6 percent Group VIII metal, and from about 2 percent to about 10 percent fluoride, preferably from about 5 percent to about 8 percent fluoride, based on the total weight of the catalyst composition (dry basis), such fluoride concentration being referred to herein as the bulk fluoride concentration. The catalyst composition is constituted of alumina, or alumina-containing, particles which contain a discrete outer shell within which Group VIII metal is distributed, with only a minor portion of the fluoride distributed thereon.

Platinum is the preferred Group VIII metal where Group VIII refers to the Periodic Table of Elements (E. H. Sargent & Co., Copyright 1964 DynaSlide Co.).

The particulate catalyst in a form suitable for a fixed bed operation, e.g., an extrudate having a diameter in the range of 1/32-⅛ inches, will have a fluoride concentration less than about 3.0 weight percent, preferably less than about 1.0 weight percent and most preferably less than 0.5 weight percent in the layer defining the outer surface of the catalyst, provided that the surface fluoride concentration is less than the bulk fluoride concentration. The outer surface is measured to a depth less than one one hundredth of an inch. The surface fluoride was calculated from total fluoride analysis and electron microscopy analysis. The remaining fluoride is distributed at a depth below the outer shell into and within the particle interior.

The fluoride content of the catalyst can be determined in a number of ways.

One technique analyzes the fluorided catalyst using oxygen combustion methodology which is well established in the literature. Approximately 8–10 mgs of sample is mixed with 0.1 g benzoic acid and 1.2 gms of mineral oil in a stainless steel combustion capsule which is mounted in a 300 mL. Parr oxygen combustion bomb. The "sample" is purged of air and subsequently combusted under 30 Atms of pure oxygen. Combustion products are collected in 5 mL. of deionized water. Once the reaction has gone to completion (about 15 minutes), the absorbing solution is quantitatively transferred and made to fixed volume.

Fluoride concentration of the sample is determined by ion chromatography analysis of the combustion product solution. Calibration curves are prepared by combusting several concentrations of ethanolic KF standards (in the same manner as the sample) to obtain a 0–10 ppm calibration range. Fluoride concentration of the catalyst is calculated on an ignition-loss-free-basis by comparison of the sample solution response to that of the calibration curve. Ignition loss is determined on a separate sample heated to 800 degrees F for at least 2 hours. Ion chromatographic analysis uses standard anion conditions.

Another procedure employs the use of fluoride distillation with a titrimetric finish. Fluorides are converted into fluorosilicic acid ($H_2SiF_6$) by reaction with quartz in phosphoric acid medium, and distilled as such using super heated steam. This is the Willard-Winter-Tananaev distillation. It should be noted that the use of super heated, dry (rather than wet) steam is crucial in obtaining accurate results. Using a wet steam generator yielded results 10–20% lower. The collected fluorosilicic acid is titrated with standardized sodium hydroxide solution. A correction has to be made for the phosphoric acid which is also transferred by the steam. Fluoride data are reported on an ignition-loss-free-basis after determination of ignition loss on sample heated to 400 degree C for 1 hour.

X-ray diffraction data (X-ray Diffractometer, Scintag USA) show that the catalyst of the invention will have high intensity peaks characteristic of aluminum fluoride hydroxide hydrate as well as the peaks normally associated with gamma alumina. In accordance with the invention, the catalyst has an aluminum fluoride hydrate level greater than about 60 where an aluminum fluoride hydrate level of 100 corresponds to the X-ray diffraction peak height at $2\theta = 5.66$ Å for a Reference Standard defined as follows.

The Reference Standard contains 0.6 wt % Pt and 7.2 wt % F on $\gamma$ alumina having a surface area of about 150 m$^2$/g. The Reference Standard is prepared by treatment of a standard reforming grade platinum on alpha alumina material containing 0.6 wt % Pt on 150 m$^2$/g surface area $\gamma$ alumina by single contact with an aqueous solution containing a high concentration of hydrogen fluoride (e.g., 10–15 wt % such as 11.6 wt % HF solution) with drying at 300° F.

The platinum contained on the alumina component of the catalyst of the invention will preferably have an average crystallite size of up to 50 Å, more preferably below about 30 Å, and most preferably the crystallite size average will range from about 12 Å to about 20 Å. It is to be understood that the alumina component of the catalyst may contain minor amounts of other materials, such as, for example, silica, and that alumina herein encompasses alumina-containing materials.

The catalyst of the invention is preferably prepared by contacting a calcined platinum-on-alumina catalyst composition, preferably one wherein the platinum is distributed generally substantially uniformly throughout a particulate alumina support, with a solution of a fluoride compound at a pH of less than 3.5, preferably hydrogen fluoride, containing at least about 10 percent to about 20 percent, preferably from about 10 percent to about 15 percent of the fluoride compound, based on the weight of the solution, to disperse a major concentration of the fluoride within the interior of the particles. The catalyst composite is washed and dried at a temperature not in excess of 650° F., preferably not in excess of about 500° F., and more preferably not in excess of about 300° F., to preserve the high intensity peaks shown by x-ray diffraction data to be characteristic of aluminum fluoride hydroxide hydrate as well as the peaks normally associated with gamma alumina.

BRIEF DESCRIPTION OF THE DRAWINGS

FIG. 2 depicts a plot of x-ray diffraction data of a fluorided platinum alumina catalyst not of this invention wherein, after impregnation of the platinum upon the alumina support, calcination of the platinum-alumina support, and adsorption of fluoride onto the calcined platinum-alumina support, the catalyst was dried and calcined at temperature in excess of 650° F. (16 hours at 1000° F.).

DETAILED DESCRIPTION

Figure 1A:
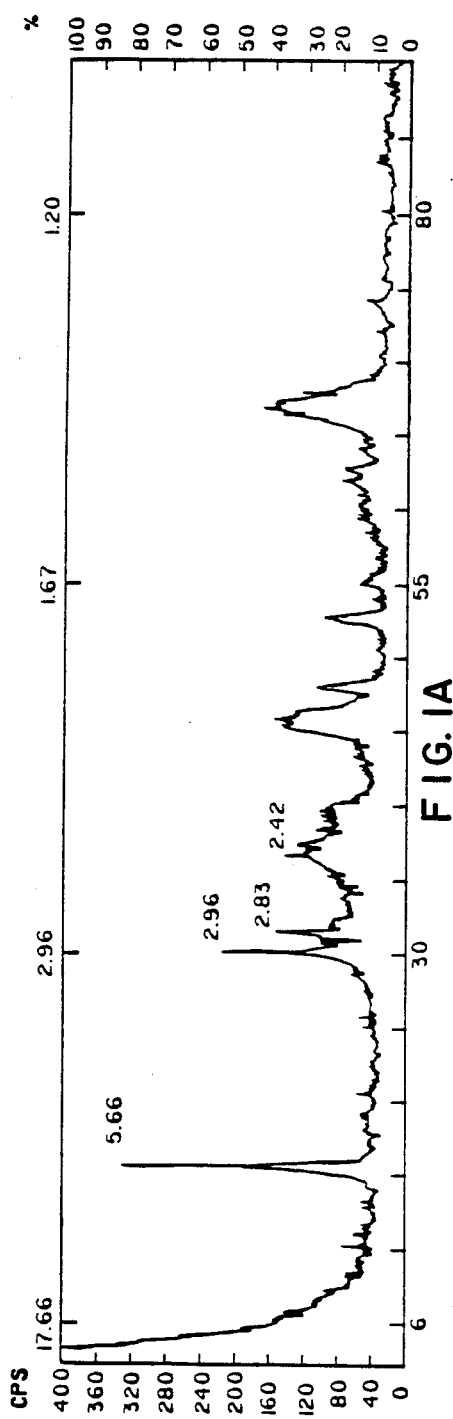
FIG. 1 depicts, in accordance with the practice of this invention, a plot of x-ray diffraction data of a fluorided platinum alumina catalyst wherein, after impregnation of the platinum onto the alumina support, calcination of the platinum-alumina support, and adsorption of the fluoride upon the calcined alumina support, the catalyst was dried at temperature not exceeding 650° F.

A particulate fluorided platinum alumina catalyst composition comprised of from about 0.1 to about 2 percent platinum, preferably from about 0.3 to about 0.6 percent platinum, and from about 2 percent to about 10 percent fluoride, preferably from about 5 percent to about 8 percent fluoride, based on the total weight of the catalyst composition (dry basis), is found useful for the production of liquid hydrocarbon fuels from a wax. The platinum is distributed into individual particles of the particulate alumina from the outer peripheral surface inwardly to the very center, or core of the particles.

The outermost surface of a particle, as indicated, contains platinum but is substantially devoid of or contains minimal concentration of fluoride. The interior, and preferably a discrete inner shell, contains both platinum and fluoride. The interior, or inner shell of platinum and fluoride, due to its different composition, distinctive boundary, or boundaries, and location within the particles in effect delineates and defines an outer shell rich in platinum but deficient in fluoride. The absence, or low level of fluoride in the outer shell reduces cracking, and less cracked products are found in the use of such catalyst particles.

In forming the particulate fluorided platinum alumina catalyst of the invention, the platinum is distributed, generally substantially uniformly throughout a particulate alumina support, the platinum-alumina composite is calcined, and the fluoride then adsorbed upon a particulate form of the calcined platinum-alumina composite to deposit a major concentration of the fluoride within the interior of the particles. The platinum is initially added to an alumina support, calcined or uncalcined, in any suitable manner and atomically dispersed, generally substantially uniformly throughout said support in average crystallite size preferably ranging up to about 50 Angstrom units (Å), and more preferably the average crystallite size will not exceed about 30 Å. In the actual catalyst preparation steps, the platinum component is distributed substantially uniformly throughout a particulate alumina support, suitably by cogellation or by impregnation of a precalcined support, and the platinum-alumina composite is then calcined, suitably at relatively high temperature. Calcination temperatures suitably range above about 650° F., preferably from about 900° F. to about 1000° F. The fluoride is then absorbed upon and distributed into the particles, suitably from a solution containing a high concentration of a fluoride compound, suitably hydrogen fluoride. The fluoride will then be adsorbed into the platinum-alumina particles, the fluoride penetrating and passing through the outermost layer of platinum, sufficient to form in effect a distinct boundary containing both platinum and fluoride, contiguous and interfacing with said outer shell rich in platinum, but lean in fluoride. After addition of the fluoride, the composite can thereafter be washed and then dried at a temperature not in excess of 650° F., and preferably not in excess of about 500° F., and more preferably not in excess of about 300° F.

X-ray diffraction data show that a catalyst composite constituted of a precalcined platinum-on-alumina support on which the platinum has been uniformly distributed, and the catalyst composite then fluorided to distribute fluoride primarily into the interior of the composite, will contain platinum as a shell on the outer surface of the particles, and this shell will interface with an inner layer, and preferably an inner contiguous shell, of both platinum and fluoride. The composite, if dried at temperatures not exceeding 650° F., preferably 500° F., and more preferably about 300° F., without exposure to any higher catalyst preparation temperature will differ profoundly from fluorided platinum catalyst compositions described by the prior art. These catalysts will be more highly selective in the production of a lower molecular weight hydroisomerized product from a hydrocarbon synthesis, or Fischer-Tropsch wax, or feed fraction derived therefrom, at hydroisomerization and mild hydrocracking conditions than known prior art catalysts. Indeed, these catalysts have higher selectivity in said hydroisomerization and mild hydrocracking reactions than fluorided platinum catalyst compositions similarly prepared except that the catalyst on which the platinum and fluoride are dispersed is calcined, or heated at a temperature in excess of 650° F. during catalyst preparation. The catalyst composition of this invention is shown by x-ray diffraction data to possess high intensity peaks characteristic of aluminum fluoride hydroxide hydrate as well as the peaks normally associated with gamma alumina whereas the calcined catalyst shows greatly reduced or no hydrate peaks. The fluorided platinum catalyst compositions of this invention, characterized by x-ray diffraction data to possess high intensity peaks characteristic of aluminum fluoride hydroxy hydrate, when employed for use in treating a hydrocarbon feed, or feed fraction derived from a hydrocarbon synthesis or Fischer-Tropsch process at hydroisomerization and mild hydrocracking conditions are far more selective, particularly during the earlier stages of a run, at lower reaction temperatures for the production of liquid hydrocarbon fuels even than catalyst compositions otherwise similar except that they have been calcined, or heated during the catalyst preparation steps at excessive temperatures after the platinum and fluoride have been composited with the alumina support.

The particulate catalyst composition of this invention is prepared by compositing a compound, or salt, of platinum and a compound, or salt, of a fluoride with a particulate alumina support. The platinum-alumina composite can be, and generally is prepared in conventional manner and the fluoride adsorbed thereupon in specified manner to produce the catalyst of the invention. The alumina support can be separately prepared, and the platinum then composited therewith, or the platinum-on-alumina composite can be formed in a single step, as by cogellation of the reactants which simultaneously form the platinum-on-alumina composite. The platinum component may be incorporated in the particulate platinum-alumina composite in any manner known to distribute the platinum component to the required depth within, or throughout the alumina. A catalytically active amount of the platinum can thus be incorporated with the catalyst in any suitable manner, such as by coprecipitation or co-gellation with the alumina support, or by ion exchange with the alumina support and/or at any stage in preparation and either after or before calcination of the alumina hydrogel. A preferred method for adding the platinum group metal to the alumina support involves the use of an aqueous solution of a water soluble compound, or salt of platinum to impregnate the alumina support. For example, platinum may be added to the support by co-mingling the uncalcined alumina with an aqueous solution of chloroplatinic acid, ammonium chloroplatinate, platinum chloride, or the like, to distribute the platinum substantially uniformly throughout the particle. Following the impregnation, the impregnated support can then be dried, and subjected to a high temperature calcination, generally at a temperature in the range from about 700° F. to about 1200° F., preferably from about 850° F. to about 1000° F., generally by heating for a period of time ranging from about 1 hour to about 20 hours, preferably from about 1 hour to about 5 hours. The platinum component added to the alumina support, is always calcined at high temperature to fix the platinum thereupon prior to adsorption of a fluoride, suitably hydrogen fluoride, into the platinum-alumina composite. Alternatively the solution of a water soluble compound, or salt of platinum can be used to impregnate a precalcined alumina support, and the platinum-alumina composite again calcined at high temperature after incorporation of the platinum.

Suitably, the platinum component is substantially uniformed distributed throughout a precalcined alumina support by impregnation. The platinum-alumina composite is then again calcined at high temperature, and the fluoride, preferably hydrogen fluoride, is distributed onto the precalcined platinum-alumina composite in a manner that most of the fluoride will be substantially composited at a level below the outer surface of the particles. Distribution of the fluoride, preferably hydrogen fluoride, is preferably achieved by a single contact of the precalcined platinum-alumina composite with a solution which contains the fluoride in sufficiently high concentration. Preferably an aqueous solution containing the fluoride in high concentration is employed, a solution generally containing from about 10 percent to about 20 percent, preferably from about 10 percent to about 15 percent hydrogen fluoride. Solutions containing hydrogen fluoride in these concentrations will be adsorbed to incorporate most of the hydrogen fluoride below the outer surface of the platinum-alumina particles. The platinum-alumina composite, after adsorption thereupon of the fluoride component is heated during preparation to a temperature ranging up to but not exceeding about 650° F., preferably about 500° F., and more preferably 300° F. A characteristic of the inner platinum-fluoride containing layer is that it contains a high concentration of aluminum fluoride hydroxide hydrate. It can be shown by x-ray diffraction data that a platinum-alumina catalyst formed in such manner displays high intensity peaks characteristic of both aluminum fluoride hydroxide hydrate and gamma alumina. An x-ray diffraction pattern can distinguish the catalysts of this invention from fluorided platinum alumina catalysts of the prior art.

X-ray diffraction trace data are given for a preferred catalyst of this invention in Table IA, and these data are graphically depicted in FIG. 1. The preparation of this catalyst is given as follows: A commercially obtained calcined platinum on alumina catalyst in the form of a 1/16 inch diameter extrudate containing 0.6 wt % platinum and sold under the trade-name Ketjen CK-306 was treated in a single contact with an aqueous solution containing 11.6 wt % hydrogen fluoride to adsorb the hydrogen fluoride. The fluorided platinum on alumina composite was then heated to a temperature of 350° F. over a period of 16 hours. The specimen was then subjected to x-ray diffraction analysis, and an x-ray trace of this specimen was made. The x-ray diffraction trace data are given in Table IA, and graphically depicted in FIG. 1. This is a catalyst of the invention.

TABLE IA

| Sample FN: 4039 Q4.RD; ID: 4262 - GPH 143 | |
|---|---|
| D | Relative Intensity I/I |
| 5.7 | Strong |
| 4.55 | Weak |
| 2.96 | Strong |
| 2.83 | Medium |
| 2.468 | Weak |
| 2.424 | Medium |
| 2.280 | Medium |
| 2.005 | Weak |
| 1.983 | Strong |
| 1.892 | Medium |
| 1.738 | Medium |
| 1.665 | Weak |
| 1.549 | Weak |
| 1.514 | Weak |
| 1.498 | Weak |
| 1.480 | Weak |
| 1.396 | Strong |
| 1.378 | Medium |
| 1.277 | Weak |
| 1.154 | Weak |
| 1.144 | Weak |
| 1.124 | Weak |
| 1.097 | Weak |

A fluorided platinum catalyst composition was prepared in similar fashion to that described for use in obtaining the data given by reference to Table IA and FIG. 1, except that the specimen of calcined gamma alumina to which the platinum and fluoride had been added was calcined by heating same to a temperature of 1000° F. for a period of 16 hours. These data are given for comparative purposes reference being made to Table IB, and to the graphical representation thereof as given in FIG. 2.

TABLE IB

| Sample FN: 5079 Q3.RD; ID: 4260 - GPH 2040 | |
|---|---|
| DÅ | Relative Intensity I/I |
| 4.55 | Weak |
| 2.808 | Weak |
| 2.415 | Medium |
| 2.272 | Medium |
| 1.975 | Strong |
| 1.514 | Medium |
| 1.395 | Strong |
| 1.141 | Weak |

These compositions are compared for convenience with specimens of aluminum fluoride hydroxide hydrate and gamma alumina (gamma alumina oxide), the characteristics of each which are also given for comparative purposes in Table IC and ID, and in FIGS. 1 and 2.

TABLE IC

| | Aluminum Fluoride Hydroxide Hydrate | |
|---|---|---|
| DÅ | I/I | nKl |
| 5.7 | 100 | 111 |
| 2.979 | 50 | 311 |
| 2.841 | 20 | 222 |
| 2.460 | 6 | 400 |
| 2.258 | 4 | 331 |
| 2.009 | 10 | 422 |
| 1.893 | 20 | 333,551 |
| 1.737 | 25 | 440 |
| 1.661 | 8 | 531 |
| 1.553 | 6 | 620 |
| 1.498 | 10 | 533 |
| 1.480 | 10 | 622 |
| 1.375 | 12 | 711,551 |
| 1.277 | 10 | 731,553 |
| 1.158 | 6 | 822.660 |
| *1.127 | 4 | 662 |
| 1.099 | 4 | 840 |

TABLE ID

| | Gamma Aluminum Oxide | |
|---|---|---|
| DÅ | I/I | nKl |
| 4.56 | 40 | 111 |
| 2.80 | 20 | 220 |
| 2.39 | 80 | 311 |
| 2.28 | 50 | 222 |
| 1.977 | 100 | 400 |
| 1.520 | 30 | 511 |
| 1.395 | 100 | 440 |
| 1.140 | 20 | 444 |

The values obtained, and reported in Tables IA and IB were determined by standard x-ray diffraction techniques. The radiation used was the K-alpha doublet of copper and a diffractometer equipped with a solid state germanium crystal detector and an associated computer. The peak heights, I, and the positions as a function of 2 theta, where theta is the Bragg angle, were determined using algorithms on the computer associated with the spectrometer. From these, the relative intensities, 100 I/$I_o$, where $I_o$ is the intensity of the strongest line or peak, and d (obs.) the interplanar spacing in Angstrom units, Å, corresponding to the recorded lines, were determined. The x-ray diffraction pattern given in Table IA, and graphically depicted in FIG. 1 is characteristic of all the catalyst compositions of this invention. When the x-ray diffraction equipment is operated in this manner, as will be observed, the x-ray diffraction pattern will generally show in excess of 250 counts per second (CPS) for the peak at 5.66 Å, and in excess of 195 CPS for the peak at 2.96 Å for the catalyst of this invention. A standard sample is subjected to this analysis to obtain a relative amount of hydrate as measured by the peak at 5.66 Å.

Figure 3:
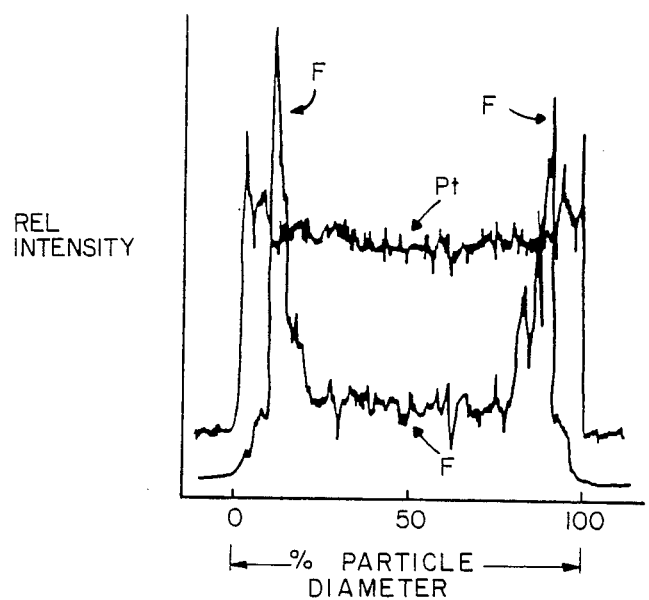
FIG. 3 depicts scanning electron microscopy data of a round cross-section of a catalyst extrudate particle according to the preferred aspects of this invention (prepared as was the catalyst described, and depicted by reference to FIG. 1), showing the relative intensities for platinum, and fluoride across the diameter of the particle.
Figure 4:
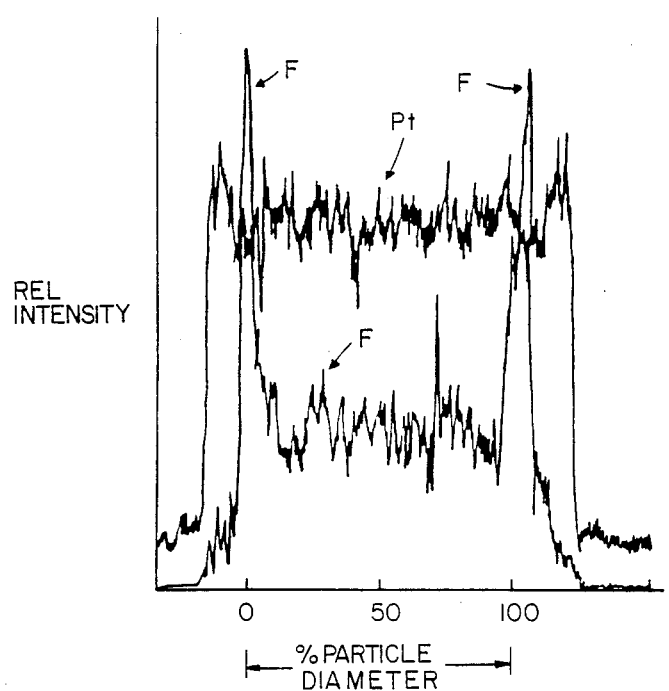
FIG. 4 depicts scanning electron microscopy data of a round cross-section of a catalyst of similar composition, and prepared in similar manner to the catalyst depicted in FIG. 3 except that after the adsorption of the fluoride onto the calcined platinum-alumina composite the catalyst composite was heated as a final step of the preparation to a temperature in excess of 650° F.

FIG. 3 presents scanning electron microscopy data on a preferred fluorided platinum-on alumina catalyst (0.58 wt. % Pt; 6.8 wt. % F) of this invention, prepared as described for use in obtaining the data given in Table IA, as further depicted by reference to FIG. 1. This catalyst, throughout which the platinum is substantially uniformly dispersed, was prepared by treating a commercial 1/16" diameter extrudate platinum/alumina reforming catalyst sold under the tradename Ketjen CK-306 with an aqueous solution containing 11.5% hydrogen fluoride over a period of 6 hours. The catalyst was dried for 3 hours in an oven at 350° F. A round cross-section of catalyst was then subjected to analysis by scanning electron microscopy, graphically given by reference to FIG. 3. FIG. 4, for purposes of comparison, likewise presents electron microscopy data of a catalyst of similar composition, and similarly prepared except that the catalyst during the final step of preparation, after the catalyst had been fluorided, was subjected to a calcination temperature of 1000° F. for a period of 3 hours in air.

The figures show the concentrations of both platinum and fluoride as a function of the particle diameter of the 1/16 inch extrudate catalyst. With regard to FIG. 3, the platinum concentration across the particle diameter appears to be fairly uniform except at the very edge of the particle, where there appears to be a little higher level of platinum than deeper within the particle. Fluoride occurs at a lower level of concentration within the edge, or outside ring of the particle. In contrast, the fluoride appears highly concentrated, with additional platinum, in a concentric ring in an area adjacent to the edge of the particle. Thus, the fluoride appears as an inside ring contiguous to and interfaced with what is in effect an outer ring within which platinum, with little or no fluoride, is distributed. Calcination at 1000° F. does not appreciably affect the platinum or fluoride concentration profile; the amount of hydrate is drastically reduced, however.

The aforedescribed catalyst of this invention is prepared such that (1) the calcined platinum-on-alumina catalyst composite is treated, in the fluoride adsorption step, with a solution that contains the fluoride in high concentration, and (2) after the fluorided platinum-on-alumina catalyst has been prepared by contact with solution, it is dried at relatively low temperature, i.e., below about 650° F., preferably below about 500° F., and more preferably about 300° F. to retain the aluminum fluoride hydroxide hydrate phase, and avoid agglomeration of the platinum. If the platinum-on-alumina catalyst, e.g., that prepared as described in obtaining the data given in Table IA, is subjected to a single treatment with an aqueous solution containing, e.g., 11.6% hydrogen fluoride, the hydrogen fluoride will be transported through the outer surface of the catalyst to a site below the outer surface of the support to form an inner ring, or shell, within which the fluoride is highly concentrated. If on the other hand, the catalyst is subjected to several adsorption steps, e.g., two adsorption steps with solutions containing the fluoride in relatively low concentrations, each solution containing for example about 5 to 6 wt. % hydrogen fluoride, albeit the catalyst may contain about 8% fluoride and contain an outer shell deficient in fluoride, no discrete fluoride ring will be present anywhere within the particle. Rather, except within the outer shell the fluoride will be substantially uniformly dispersed throughout the particles. Further, the catalyst will contain less hydrate.

The drying temperature is also important for the retention, or preservation of the aluminum fluoride hydroxide hydrate phase, and small crystallites of platinum, which are formed during the catalyst preparation steps. If, e.g., the catalyst is dried finally at 300° F., the inner fluoride shell, or ring formed during the fluoride adsorption step will be retained. If, on the other hand, the same catalyst is dried at temperatures above about 650° F., e.g., at about 900°–1000° F., the fluoride ring will continue to exist as a discrete phase. In the former case, however, the fluoride phase will continue to exist as aluminum fluoride hydroxide hydrate. In the latter case, on the other hand, a minimum amount if any of the fluoride phase will be retained as aluminum fluoride hydroxide hydrate. Moreover, the platinum crystallite size in the latter case will increase due to agglomeration of the platinum which adversely affects the activity of the catalyst for the hydroisomerization and hydrocracking of Fischer-Tropsch waxes to produce liquid hydrocarbon fuels. The catalyst of this invention, is substantially more active for the production of liquid hydrocarbon fuels than a catalyst otherwise similar except for the presence of the aluminum fluoride hydroxide hydrate phase. It is believed that the inner shell, or ring of highly concentrated fluoride is conductive to the formation and/or retention of the aluminum fluoride hydroxide hydrate phase, as well as enhancing the activity of the catalyst.

In the catalysts of this invention, the inner ring, or shell, contains a high concentration of the fluoride as a discrete aluminum fluoride hydroxide hydrate phase. In the catalyst specimen prepared, e.g., by two consecutive treatments of the catalyst with 5 to 6 wt. % hydrogen fluoride solutions, a discrete inner ring or shell wherein the fluoride was concentrated did not develop even though this catalyst contained a relatively large concentration of total fluoride, i.e., greater than about 8 wt. %. A discrete inner ring, or shell of the fluoride is formed and a high concentration of the ring fluoride is present as aluminum fluoride hydroxy hydrate where the fluoride was added by singular contact with the solution containing a high concentration of hydrogen fluoride (e.g., 11.6 wt. %). The exact mechanism of the formation of this ring is not completely understood, but it is clear that the presence of both the fluoride ring and high concentration of aluminum fluoride hydroxide hydrate within the ring will optimize the activity and selectivity of the catalyst for hydrocarbon synthesis wax isomerization to liquid hydrocarbon fuels.

Without wishing to be bound by any specific theory of mechanism, it is believed that the effectiveness of the catalyst of this invention can be explained; at least in part. Pore diffusion calculations have been made on the particulate catalysts of this invention. The hydrocarbon synthesis wax molecules are quite large, the molecular weight thereof ranging up to and in excess of 500. These molecules are estimated to have molecular diameters of about 5 to 10Å or larger, and the isomerized paraffins produced as a product can have molecular diameters in excess of 25Å. The particulate catalysts of this invention have average pore diameters ranging generally from about 100Å to 150Å, which can impose diffusional restrictions upon these molecules, especially as relates to the egrees of the isomerized molecule out of the pores of these catalysts. Further, it is known that hydroisomerization of normal paraffins occurs via the formation of an olefinic intermediates over bifunctional catalysts. Initially, normal paraffins on entry into the pores of the catalyst are believed to be dehydrogenated to the normal-olefin over a platinum site within the outer shell. This reaction is followed by isomerization of the normal-olefin to the iso-olefin, this occurring principally within the contiguous inner shell over an acidic fluoride site. The iso-olefin is then rehydrogenated over the platinum sites on egress, or diffusion of the product from the pores of the catalyst. Cracked products form via an alternate path, and iso-olefins can crack to smaller molecular fragments if contacted with an acidic fluoride site before it is rehydrogenated.

High selectivity to form isomerized fuel products is favored where the catalyst particles contain an inner fluoride ring, or shell, and the outer shell is deficient in fluoride. Pore diffusion calculation have shown that selectivity towards an isomerized product (vis-a-vis cracked products) is increased significantly by the presence of the inner fluoride ring, or shell, and a deficiency of fluoride in the outer ring, or shell. For example, cracked products can be reduced 70 wt. % or more, by placing the fluoride in the particulate catalyst as an inner ring, while maintaining a fluoride deficient outer shell, vis-a-vis a catalyst otherwise similar except that it contains a more uniform fluoride profile. Where fluoride is present in the outer ring, or shell, the iso-olefin egresses from the particle, contacts the acidic fluoride in the outer shell and cracks rather than hydrogenates. The increased activity due to the presence of the discrete inner fluoride ring, or shell provides a further advantage. With the high fluoride available at those sites wherein it is most needed, and due to its presence in the desired alumina fluoride hydroxide hydrate phase in high concentration, the overall rate of the isomerization reaction is enhanced as compared to a catalyst with a more uniform fluoride profile. A further advantage of this same catalyst is that it can be used for hydrocracking simply by raising the reaction temperature. Having the fluoride in the inner ring, or shell, permits effective utilization of the fluoride to create the highly active acidic cracking sites. Minimizing the fluoride in the exterior surfaces of the particles minimizes further re-cracking to the less desirable lower molecular weight hydrocarbons, thus maximizing the desired mid molecule cracking reactions.

To maintain the desired hydroisomerization and hydrocracking activity of the aluminum fluoride hydroxide hydrate phase, it is important to minimize the amount of nitrogen present in the catalyst. As prepared, the catalysts should have a nitrogen to aluminum ratio (N/Al) less than 0.005, preferably less than 0.002 and more preferably less than 0.0015 as measured by electron spectroscopy for chemical analysis (ESCA). The catalysts prepared by HF treatment reported herein all contain less than 0.0015 N/Al. It is also preferred that feeds treated by these catalysts contain minimal nitrogen. The hydrocarbon synthesis feeds utilized herein all contained minimal nitrogen compounds.

Figure 5:
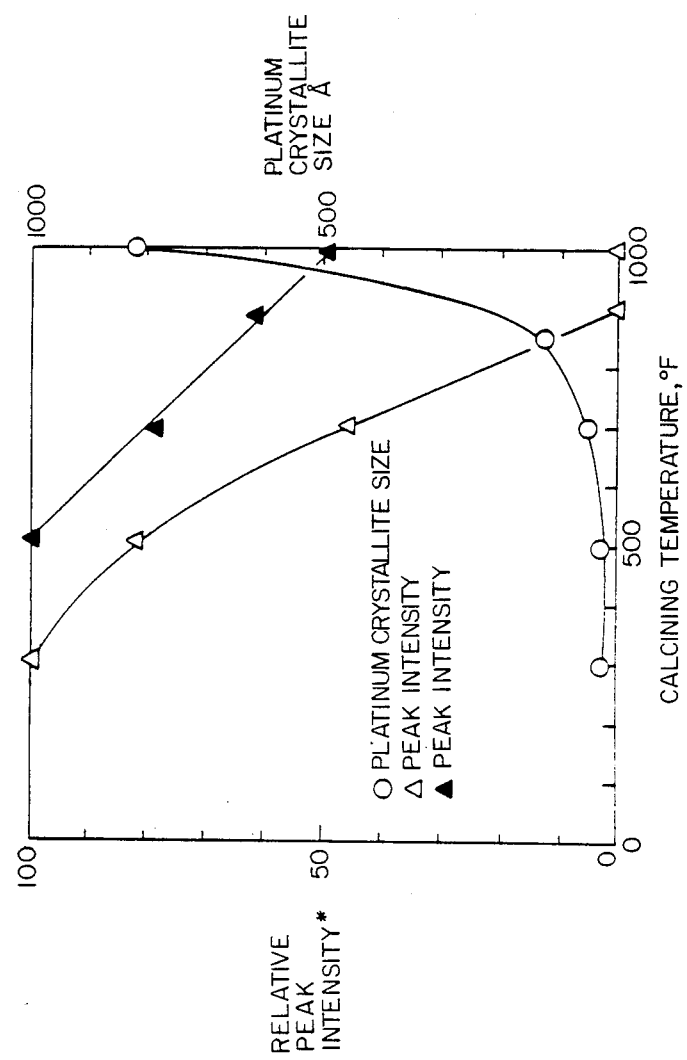
FIG. 5 presents a plot of the $2\theta = 30°$ (D=2.96 Å) and $2\theta = 16°$ (D=5.66 Å) lines for aluminum fluoride hydroxide hydrate as a function of catalyst calcination temperature along with, for comparative purposes, similar data of the platinum crystallite sizes.

FIG. 5 demonstrates the effect, in the preparation steps, of final calcination temperature on the average platinum crystallite size and the amount of aluminum fluoride hydroxide hydrate retained, or lost. A catalyst was prepared using a sample of commercially available 0.6% platinum on a 1/16 inch diameter alumina extrudate reforming catalyst. This catalyst was treated with an aqueous solution containing 11.6 wt % hydrogen fluoride as previously described. Samples of this catalyst were dried for 3 hours at 300° F., 500° F., 700° F., 900° F., and 1000° F., respectively. Each sample, to determine the crystallite size of the platinum was analyzed using oxygen chemisorption (full details of the apparatus and procedure can be found in the literature. See, e.g., D. J. C. Yates, W. F. Taylor, and J. H. Sinfelt, J. Am. Chem. Soc., 86, 2996, 1964 and D. J. C. Yates and J. H. Sinfelt, J. Catalysis, 8, 348, 1967). The plot shows the platinum crystallite size as a function of the final air calcination temperature.

Each sample was further analyzed using x-ray diffraction, as described previously. The aluminum fluoride hydroxide hydrate peaks at $2\theta = 16°$ (D = 5.66Å) and $2\theta = 30°$ (D = 2.96Å) were selected as measures of the relative amount of that phase present. Generally, the peak at 5.66Å will show in excess of 250 CPS, and the peak at 2.96Å will show in excess of 195 CPS for the catalyst compositions of this invention. These values were assigned a relative value of 100, these peak heights corresponding to the peak heights for the sample heated at 300° F., arbitrarily selected to be the Reference Standard referred to hereinbefore. This Reference Standard contains 0.6 wt % Pt and 7.2 wt % F on γ alumina having a surface area of about 150 m²/g. The relative peak height measured for the 5.66Å peak is taken as a measure of the aluminum fluoride hydroxide hydrate content with the 5.66Å peak of the Reference Standard assigned a hydrate level of 100. A material having an aluminum fluoride hydrate level of 60 would therefore have a 5.66Å peak height equal to 60% of the 5.66Å peak height of the Reference Standard. Similarly, a material having an aluminum fluoride hydrate level of 80 would therefore have a 5.66Å peak height equal to 80% of the 5.66Å peak height of the Reference Standard.

The data show that the final drying or calcination step is important for retention of the desired aluminum fluoride hydroxide hydrate phase. When the sample was dried or calcined in air at 900°–1000° F. little evidence of the preferred fluoride phase existed. As the drying temperature was decreased, as graphically depicted in FIG. 5, the preferred fluoride phase began to appear, reaching a maximum retention in the neighborhood of 300° F. The calcination temperature is set such that the relative peak height for the 5.66Å peak of the aluminum fluoride hydroxide hydrate is greater than 60, preferably greater than 80 and most preferably at least about 100. Similarly, as graphically depicted in FIG. 5, the platinum exhibited excessive agglomeration when the sample was calcined in air at 900°–1000° F. When the drying temperature was reduced to 500° F. and below, the highly desirable small crystallite platinum was retained. Consequently, calcination temperatures are set to provide final catalysts with platinum crystallite sizes preferably less than about 50Å, more preferably less than about 30Å. The presence of the highly active small crystallites of platinum are needed to dehydrogenate the normal paraffins, and rehydrogenate the iso-olefins. The high concentration of the aluminum fluoride hydroxide hydrate phase in the interior ring is needed to optimize isomerization of the normal olefinic intermediates.

The invention, and its principle of operation, will be more fully understood by reference to the following examples. All parts are in terms of weight except as otherwise specified.

EXAMPLE 1

This example exemplifies the production of a pumpable syncrude (<70° F. pour point) from a Fischer-Tropsch wax, by reaction of the wax over a Pt/F/Al$_2$O$_3$ (0.58 wt % Pt, 7.2 wt % F.) catalyst of this invention (Catalyst A), this run being contrasted with a run made at similar conditions over a second catalyst, Catalyst B, of similar composition made at similar conditions except that the catalyst was calcined during the final step of the catalyst preparation procedure at 1000° F.

The catalyst employed in these runs, Catalysts A and B, were prepared by impregnation of a precalcined commercial reforming catalyst available under the tradename Ketjen CK-306, in the form of 1/16" diameter extrudates, by contact with hydrogen fluoride (11.6 wt. % HF solution). The catalysts were covered with the HF solution for a period of 6 hours, and occasionally stirred. The HF solution was then decanted from the catalysts, and the catalysts then washed with deionized water. The catalysts were then dried overnight and throughout the day in flowing air, and then dried in an oven overnight at 260° F. Catalyst A, after drying was reduced by contact with hydrogen at 650° F. The catalyst has pore of average diameter ranging from about 100Å to 150Å, a pore volume of from about 0.5 cc/g to 0.6 cc/g, and a surface area of 121.8 m²/g. Catalyst B, after drying was calcined at 1000° F., and thereafter reduced with hydrogen at 650° F. The catalyst has pores of 175Å average diameter and a surface area of 165.1 m²/g. The concentration of fluoride at the edge of Catalyst A was calculated from the total fluoride analysis (7.2 wt %) and FIG. 3 to be 1.4 wt %.

Catalysts A and B, respectively, were employed as 14/35 mesh crushed extrudates to hydrocrack and hydroisomerize a 550° F.+ fraction split from a raw Fischer-Tropsch wax obtained by reaction of a synthesis gas over a ruthenium catalyst. The raw Fischer-Tropsch wax was thus split into 550° F.− and 550° F.+ fractions, and the 550° F.+ fraction was reacted over Catalysts A and B, respectively, in separate runs. The C$_5$+ liquid products obtained from each of these runs, respectively, were then blended back, in production amounts, with the 550° F.− fraction to obtain the pumpable syncrude products. The process conditions for each of the runs, the characterization of the raw Fischer-Tropsch feed obtained by reaction over the ruthenium catalyst, and the pumpable syncrude products obtained by runs made with Catalyst A (Product A) and Catalyst B (Product B), respectively, are given as follows:

| Process Conditions | Catalyst A | Catalyst B |
|---|---|---|
| Temperatures, °F. | 660 | 660 |
| Pressure, psi | 1000 | 1000 |
| Space Velocity, V/V/Hr. | 0.5 | 0.5 |
| Gas Rate, Scf H$_2$/Bbl | 8000 | 8000 |

| | Product A | Product B | Raw Fischer Tropsch Wax Feed |
|---|---|---|---|
| Gravity, API | 44.8 | 42.6 | 39.0 |
| Pour Point, °F. | 21 | 75 | Hard Solid |

Scanning Electron Microscope (SEM) profiles made of each of these catalysts are as previously described by reference to FIGS. 3 and 4. The SEM profile for Catalyst A, a preferred catalyst of this invention, is as depicted by reference to FIG. 3. The SEM profile for Catalyst B, a catalyst not of this invention, is as depicted by reference to FIG. 4. The data presented by reference to FIG. 3 clearly show that Catalyst A contains two distinct concentric shells, an outer shell containing a high concentration of platinum, with a low concentration of fluoride, and an inner shell interfaced therewith which contains relatively high concentrations of both platinum and fluoride. An inner core contains platinum, and a minimum amount of fluoride. A major concentration of the fluoride on Catalyst A is present as aluminum fluoride hydroxide hydrate. Catalyst B is not shown to contain any significant concentration of aluminum fluoride hydroxide hydrate.

EXAMPLE 2

This example demonstrates the conversion by hydrocracking of a solid waxy 550° F.+ Fischer-Tropsch product to premium quality distillates employing Catalyst A, the preparation and characteristics of which are described by reference to Example 1. A comparison is made with a run at similar conditions with the same feed employing Catalyst B, also as previously described. A second comparison is made with a commercially obtained nickel-silica/alumina (5 wt. % NiO) catalyst (Catalyst C), of a type commonly used in hydrocracking operations with low nitrogen-containing hydrocarbons tested as 14/35 mesh crushed extrudates.

In these runs, the raw Fischer-Tropsch syncrude obtained by reaction of carbon monoxide and hydrogen over a ruthenium catalyst, was distilled to obtain a 700° F.+ fraction. The 700° F.+ fraction was reacted, with hydrogen, over each of Catalysts A, B, and C, respectively, at 50 percent conversion to obtain a product; the product from Catalyst A being hereinafter referred to as Product A, the product from Catalyst B is Product B, and the product from Catalyst C as Product C. Process conditions for each of the three runs, and the distribution of the products obtained are tabulated below.

|  | Catalyst | | |
| --- | --- | --- | --- |
|  | A | B | C |
| Process Conditions | | | |
| Temperature, °F. | 660 | 700 | 576 |
| Pressure, psi | 1000 | 1000 | 1000 |
| V/V/Hr. | 0.45 | 0.45 | 0.45 |
| Gas Rate, Scf H$_2$/Bbl | 8000 | 8000 | 8000 |
| Product Distribution Yield on Feed, Wt. % | | | |
| H$_2$O | 0.27 | 0.27 | 0.27 |
| C$_3$— | 1.9 | 0.9 | 1.7 |
| C$_4$ | 1.7 | 1.7 | 8.8 |
| C$_5$-320° F. | 11.7 | 9.4 | 35.0 |
| 320-700° F. | 67.2 | 61.7 | 28.5 |
| 700° F.+ | 18.1 | 26.8 | 27.2 |

These data show that Catalyst A is more effective for the conversion of the feed to gasoline and middle distillates, without excessive gas formations than Catalyst B even at lower temperatures. Catalyst C, on the other hand, shows poor selectivity for distillate production and excessive gas formation relative to Catalyst A.

EXAMPLE 3

This example demonstrates the production of an isoparaffinic naphtha and jet fuel by conducting a hydrocracking-hydroisomerization reaction of a 700° F.+ Fischer-Tropsch wax over Catalyst A. This run is compared with a run made by reaction of the feed at similar conditions over Catalyst B, as previously described.

A 700° F.+ fraction from a Fischer-Tropsch operation, as described by reference to Example 2, was thus reacted at similar conditions over Catalyst A and Catalyst B, respectively, and comparisons made between the runs to show the effectiveness of each in the production of naphtha, jet fuel and diesel fuel. The process conditions of these runs are given below, along with a comparison of the products obtained from the runs employing Catalyst A (Product A) and Catalyst B (Product B), respectively.

|  | Catalyst | |
| --- | --- | --- |
| Process Conditions | A | B |
| Temperature, °F. | 650 | 650 |
| Pressure, psi | 1000 | 1000 |
| V/V/Hr. | 0.5 | 0.5 |
| Gas Rate, Scf H$_2$/Bbl | 7000 | 7000 |

| Product Distribution Yield on Feed, Wt. % | Product A | | Product B | | Feed |
| --- | --- | --- | --- | --- | --- |
| C$_3$— | 4.7 | (VOL %) | 0.4 | (VOL %) | |
| iC$_4$ | 9.8 | (13.6) | 0.41 | (0.57) | |
| nC$_4$ | 5.0 | (7.0) | 0.36 | (0.5) | |
| C$_5$-320° F. | 65.3 | (73.6) | 3.7 | (4.3) | |
| 320-550° F. | 18.3 | (19.7) | 6.0 | (11.1) | |
| 550-700° F. | 0.2 | (0.2) | 10.1 | (10.6) | |
| 700° F.+ | nil | nil | 74.9 | (75.6) | 100.0 |

These data show the superior performance of Catalyst A for the production of naphtha, jet fuel and diesel fuel as contrasted with Catalyst B.

EXAMPLE 4

A catalyst was prepared in a manner similar to that used for Catalyst A of Example 1 except it was dried at 300° F. A sample of the catalyst was also calcined at 750° F. The 300° F. dried catalyst exhibited a relative peak intensity of 100% for the aluminum fluoride hydroxide hydrate phase whereas the 750° F. calcined catalyst showed a loss of peak intensity down to 60%. Each of these catalysts were tested for hydroisomerization/hydrocracking of hydrotreated petroleum slack wax. Each was reduced with hydrogen at 650° F. at atmospheric pressure and tested at temperatures ranging up to 650° F. Discharged samples of the catalyst revealed that the 300° F. calcined catalyst had a loss in peak height down to 66% wherein the 750° F. calcined catalyst peak height was relatively unchanged. These catalysts had a N/Al ratio of 0.0012.

EXAMPLE 5

A series of catalysts were prepared in a manner described by reference to Example 4, except the catalysts were dried or calcined at 300° F. (Catalyst E), 500° F. (Catalyst F), 700° F. (Catalyst G), 900° F. (Catalyst H), and 1000° F. (Catalyst I). Drying/Calcination was conducted for period of 3 hours. The catalysts were subjected to x-ray diffraction analysis, platinum content analysis, chemisorption analysis for platinum crystallites size, and analysis for fluoride content. Fluoride analysis showed that Catalyst E contained 7.9 wt. % fluoride. The results are tabulated in Table II. The Pt crystallite size and x-ray diffraction data for these catalysts are graphically illustrated, and plotted in FIG. 5.

TABLE II

|  | Catalyst | | | | |
| --- | --- | --- | --- | --- | --- |
|  | E | F | G | H | I |
| Drying/Calcination, °F. | 300 | 500 | 700 | 900 | 1000 |
| Wt. % Platinum | 0.578 | 0.513 | 0.598 | 0.592 | 0.601 |
| Average Cryst. Size, Å | 26 | 29 | 49 | 121 | 818 |
| X-ray Diffraction* | | | | | |
| D = 5.66A | 100 | 100 | 80 | 61 | 49 |
| D = 296A | 100 | 82 | 36 | 0 | 0 |

*Relative Peak Intensity.

The results show that platinum agglomeration increases exponentially as the Drying/Calcination temperature is increased. Significant agglomeration begins to occur as temperature is increased from above 500° F. to 700° F., and greater. As indicated by the x-ray diffraction peak at D=2.96Å, a significant decrease in the amount of alumina fluoride hydroxide hydrate phase begins to occur at temperatures above about 300° F. when the catalyst is dried or calcined in air. Although this peak indicates none of the phase is present at 900° F. and above, the peak at D=5.66Å indicates that some is still retained, albeit to a very low level. Scanning Electron Microscopy, or SEM analyses of the samples showed evidenced that the inner fluoride ring existed as shown in FIG. 3.

EXAMPLE 6

Another series of catalysts, Catalysts J, K, and L, were prepared to demonstrate the importance of catalyst preparation conditions. These catalysts were prepared in a manner similar to those of Example 4 except that all of these catalysts were dried at 300° F. drying temperature. The low drying temperature avoided platinum agglomeration and provided maximum retention of the aluminum fluoride hydroxide hydrate phases. Catalyst J was prepared by impregnation in a single contact with a solution containing 5.8 wt. % HF and Catalyst K was prepared with two consecutive HF treats with solutions each containing 5.8 wt. % HF. Catalyst L was prepared by a single HF treat with a solution containing 17.4 wt. % HF. Each of these catalysts was analyzed by x-ray diffraction for the presence of the aluminum fluoride hydroxide hydrate phase, for platinum content, and for platinum crystallite size by chemisorption. Analysis was also made for fluoride content, and for platinum and fluoride distribution by SEM. Analysis by SEM showed that of these three catalysts, only Catalyst L contained the inner ring or shell of high fluoride concentration, similar to that obtained with Catalyst A, depicted by reference to FIG. 3. The results are presented in Table III along with data for Catalyst A for comparative purposes.

TABLE III

| | Catalyst | | | |
|---|---|---|---|---|
| | J | K | L | A |
| % HF in Solution | 5.8 | 5.8 | 17.4 | 11.6 |
| HF Treat(s) | 1 | 2 | 1 | 1 |
| Wt. % Fluoride in Catalysts | 4.3 | 8.4 | 9.2 | 7.2 |
| Wt. % Pt in Catalyst | 0.62 | 0.57 | 0.54 | 0.58 |
| Pt Average Cryst. Size, Å | 25 | 26 | 25 | 19–22 |
| X-ray Diffraction[1] | | | | |
| D = 5.66Å | 54 | 85 | 120 | >100 |
| D = 2.96Å | 60 | 79 | 94 | 100 |
| Fluoride Distribution[2] | | | | |
| Outer Ring | | | | |
| Thickness, mm | 0.15–0.18 | 0.19–0.21 | 0.12–0.20 | 0.1–0.19 |
| % of Total F | 6.0 | 3.5 | 4.0 | 2.6 |
| Inner Ring | | | | |
| Thickness, mm | 0–0.10 | 0–15 | 0.14–0.18 | 0.11–0.20 |
| % of Total F | 8.1 | 7.9 | 30.4 | 35.1 |
| Interior | | | | |
| Thickness, mm | 1.16 | 1.02 | 1.08 | 1.05 |
| % of Total F | 85.9 | 88.6 | 65.6 | 62.3 |

[1] % Relative Peak Intensity. Catalyst E being taken as a standard to which the value 100 is assigned.
[2] SEM of 1/16 inch extrudate catalyst.

The data show that all Catalyst J, K, L and A contain the aluminum fluoride hydroxide hydrate phase. However, a single treat with a solution containing HF in high concentration, i.e., about equal to or in excess of about 10 wt % HF in water is needed to produce a catalyst which contains fluoride as a distinct inner ring, or shell. This type of treat is needed to create the precursor containing a high concentration of the required aluminum fluoride hydroxide hydrate phase. As shown in Table II, catalysts A and L contain a distinct inner ring, or shell within which the aluminum fluoride hydroxide hydrate phase is concentrated. Catalyst K, it will be observed, contained a high fluoride level but a distinct inner ring of relatively high fluoride concentration was not produced, since this catalyst was made by treating the alumina with two treats with low concentration HF solutions (5.8 wt. %). The amount of the required aluminum fluoride hydroxide hydrate phase was also reduced by this type of treat. Catalyst L, in contrast to Catalysts J and K, illustrates that high levels of fluoride can be introduced on the catalyst as a distinct inner shell, and also create the high level of the aluminum fluoride hydroxide hydrate phase required for optimum catalyst performance.

Having described the invention, what is claimed is:
1. A particulate fluorided Group VIII metal-on-alumina catalyst having: (a) a Group VIII metal concentration ranging from about 0.1 to about 2 weight percent; (b) a bulk fluoride concentration ranging from about 2 to about 10 weight percent, wherein the fluoride concentration is less than about 3.0 weight percent at the outer surface layer to a depth less than one one hundredth of an inch, provided the surface fluoride concentration is less than the bulk fluoride concentration; (c) an aluminum fluoride hydroxide hydrate level greater than 60 where an aluminum fluoride hydroxide hydrate level of 100 corresponds to the X-ray diffraction peak height at 5.66Å for a Reference Standard; and (d) a N/Al ratio less than about 0.005.

2. The catalyst composition of claim 1 wherein said Group VIII metal is platinum.

3. The catalyst of claim 2 wherein the aluminum chloride hydroxide hydrate level is greater than 80.

4. The catalyst of claim 3 wherein the fluoride concentration at the surface of the catalyst is less than about 1.0 weight percent.

5. The catalyst of claim 4 wherein the N/Al ratio of the catalyst is less than 0.002.

6. The catalyst of claim 5 wherein the fluoride concentration ranges from about 5 to about 8 percent, based on the total weight of the catalyst composition.

7. The catalyst of claim 2 wherein the aluminum fluoride hydroxide hydrate level is at least about 100.

8. The catalyst of claim 6 wherein the aluminum fluoride hydroxide level is at least about 100.

9. The catalyst of claim 8 wherein the fluoride concentration at the surface of the catalyst is less than about 0.5 weight percent.

10. A process for the preparation of a particulate fluorided platinum alumina catalyst composition from a calcined platinum-on-alumina composition containing from about 0.1 to about 2 weight percent platinum, based on the total weight of the catalyst composition, which comprises:
   (a) contacting the calcined platinum-on-alumina composition with an aqueous HF solution containing from about 10 percent to about 20 percent hydrogen fluoride and having a pH below 3.5 to distribute fluoride within the interior of the alumina component and to produce a fluorided platinum alumina catalyst composition containing from about 2 to about 10 percent fluoride, based on the total weight on the catalyst composition, wherein a distinct inner ring of fluoride is formed;

(b) drying the fluorided platinum alumina catalyst composition at a temperature not in excess of 650° F., and (c) recovering a catalyst composition having an aluminum fluoride hydroxide hydrate level greater than 60, a fluoride concentration less than about 3.0 weight percent at the outer surface to a depth less than one one hundredth of an inch, and a N/Al ratio less than about 0.005.

11. The process of claim 10 wherein the fluorided platinum alumina catalyst composition is dried at a temperature not exceeding about 500° F.

12. The process of claim 11 wherein the recovered catalyst has an aluminum fluoride hydroxide hydrate level greater than 80.

13. The process of claim 12 wherein the fluorided platinum alumina catalyst composition is dried at a temperature not exceeding about 300° F.

14. The process of claim 13 wherein the recovered catalyst has an aluminum fluoride hydroxide hydrate level of at least about 100.

* * * * *